United States Patent

Miltenberger

[11] Patent Number: 5,997,029
[45] Date of Patent: Dec. 7, 1999

[54] AIRBAG MODULE FOR MOTOR VEHICLE STEERING WHEELS

[75] Inventor: Michael Miltenberger, Elsenfeld, Germany

[73] Assignee: TRW Automotive Safety Systems GmbH, Aschaffenburg, Germany

[21] Appl. No.: 08/959,499

[22] Filed: Oct. 28, 1997

[30] Foreign Application Priority Data

Nov. 2, 1996 [DE] Germany .................. 196 45 217

[51] Int. Cl.⁶ ............................................... B60R 21/22
[52] U.S. Cl. .................................. 280/728.2; 280/731
[58] Field of Search .............................. 280/728.2, 731, 280/743.1

[56] References Cited

U.S. PATENT DOCUMENTS 5,685,557  11/1997  Perrson et al. ................. 280/728.2
5,720,493   2/1998  Sugiyama et al. .................. 280/731

FOREIGN PATENT DOCUMENTS 0722861   7/1996  European Pat. Off. .
3630685   2/1988  Germany .
19521937  12/1995  Germany .
3031251    4/1996  Japan .
2290267  12/1995  United Kingdom .

Primary Examiner—Kenneth R. Rice
Attorney, Agent, or Firm—Sprung Kramer Schaefer & Briscoe

[57] ABSTRACT

An airbag module for motor vehicle steering wheels is proposed, having a gas generator (1), a folded together airbag (2), a dish-like generator support (3), a covering (4) which is connected to the generator support (3) at the edges and has predetermined breaking points (8) and also having a retaining plate (5) for fastening the airbag (2) on the generator support (3), all the elements mentioned forming a one-part structural unit which can be connected to a steering wheel.

To be able to adapt the volume inside such an airbag module to various volume requirements, without losing the abutment formed for the covering (4) by the folded together airbag (2), it is proposed that there be arranged between the gas generator (1) and the folded together airbag (2) a displacement element (6, 7) which fills a predetermined proportion of the volume available between the gas generator (1), the generator support (3) and the covering (4) for the folded together airbag (2).

8 Claims, 1 Drawing Sheet

AIRBAG MODULE FOR MOTOR VEHICLE STEERING WHEELS

BACKGROUND OF THE INVENTION

The invention relates to an airbag module for motor vehicle steering wheels, having a gas generator, a folded together airbag, a dish-like generator support, a covering which is connected to the generator support at the edges that has predetermined breaking points and also having a retaining plate for fastening the airbag on the generator support, all the elements mentioned forming a one-part structural unit which can be connected to a steering wheel.

Such modules are nowadays fitted as standard into virtually all passenger cars and must therefore be designed for mass production. This includes the requirement that, as far as possible, they are to be suitable for use not only for one type of vehicle or steering wheel but be of a size suitable for fitting a number of types, in order that the advantages of high production numbers can be fully utilized. The outer dimensions of the module must in this case be chosen such that the largest gas generators and airbags which may exist within the application range of the modules can be accommodated in said module. This provides one determinative boundary condition for the design of airbag modules.

An entirely different boundary condition arises from the fact that the covering must of course be provided with predetermined breaking points in such a way that the airbag can unfold rapidly and unhindered in the case of its use. On the other hand, the predetermined breaking points must not be weakened, or even break unintentionally, during the at least ten years of use of the motor vehicle. For the compromises which have to made in this connection there have already been made numerous proposals which have also proved successful in practice, because the airbag folded together underneath the covering generally serves as an abutment, with the result that the covering cannot be pressed inward to the extent that an overloading of the predetermined breaking point could occur when the steering wheel is handled in the customary way. For this purpose, the folded together airbag must entirely fill the volume available.

This precondition is no longer met, if, for example, a new gas generator of a smaller overall volume is to be used, if a novel fabric for the airbag takes up less volume or if in mass production it is intended to use airbag modules of predetermined outer dimensions such that the volume required for the gas generator and the folded together airbag is too large. In these cases, there is no abutment for the covering and, under certain circumstances, the predetermined breaking points experience excessive loading, which during normal use of the steering wheel could lead to unintentional breakage and make repair work necessary, in most cases substitution of the entire airbag module being the only option because individual covers are either not readily available on the market or else cannot be fitted with the means available in a workshop.

SUMMARY OF THE INVENTION

The object is consequently to develop airbag modules of the type mentioned at the beginning further in such a way that, with given outer dimensions, they can be used for volume requirements of differing sizes without the covering losing its abutment and without the pre-determined breaking points being overloaded.

To achieve this object, it is proposed according to the invention that there be arranged between the generator and the folded together airbag a displacement element which fills a predetermined proportion of the volume available between the gas generator, the generator support and the covering for the folded together airbag.

Such a displacement element has the advantage that it can easily be produced and can be adapted in a simple way to various volume requirements if the available free volume inside of the otherwise unchanged airbag module is too large for the particular application. Of course, if only a smaller volume is required for accommodating the generator and the airbag on a permanent basis and without exceptions, the entire airbag module will be made smaller. But even then, the problem described at the beginning arises in as much as on the one hand it is desired to rely on mass-produced modules but on the other hand different requirements for the available volume inside must also be met, without allowing the possibility of mechanical overloading of the predetermined breaking points. In other words, the idea of the invention can continue to be used meaningfully also in the case of the next, possibly reduced overall in size, generation of airbag modules for steering wheels.

Advantageous refinements of the idea of the invention are as follows. The displacement element can comprise a cup-shaped component with perforated or grid-like walls, which is connected at the edges to the retaining plate. The displacement element can comprise a cup-shaped component with perforated or grid-like walls, which is formed in one piece with the retaining plate. The cup-shaped component and the retaining plate can consist of a section of sheet metal which has been given the form of a hat-like cage by punched-out apertures and non-cutting shaping operations. The cup-shaped component and the retaining plate can consist of a plastic part in the form of a hat-like cage, produced by injection molding or punching out and thermoforming. The displacement element can comprise a hat-like component which, like the gas generator, is pushed into the generator support from the rear side and is fastened at the edges between the gas generator and the generator support. The hat-like component can consist of a section of sheet metal which has been given the form of a hat-like cage by punched out apertures and non-cutting shaping operations. The hatlike component can consist of a plastic part produced by injection molding or punching out and thermoforming. Further details are explained with reference to the exemplary embodiments represented in FIGS. 1 and 2, in which:

DETAILED DESCRIPTION OF THE INVENTION

Figure 1:
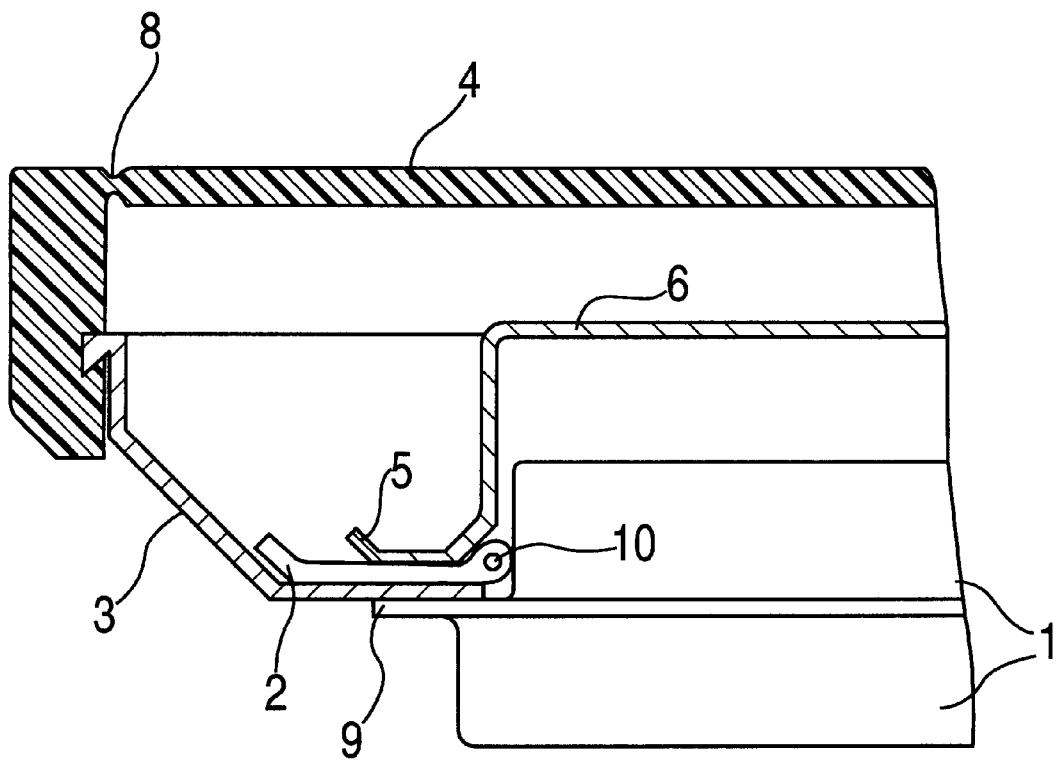
FIG. 1 shows a section through an airbag module in which the displacement element is formed in one piece with the retaining plate.

In the case of the embodiment according to FIG. 1, the gas generator 1 has a peripheral flange 9, by means of which it is connected to the generator support 3 by means of screws, rivets or the like. By means of the same connection points, the airbag 2 is at the same time clamped in between the retaining plate 5 and the generator support 3, a bolt 10 being provided at the edge in order to prevent the airbag 2 slipping out of the clamp connection in the case of use.

Covering 4 is clipped onto the generator support 3 at the edges and is provided with at least one predetermined breaking point 8 in the form of a linearly extending weakening of the material. The volume between the gas generator 1, the generator support 3 and the covering 4 is available for the folded together airbag 2, which is represented only in the region of the restraining point, in order not to impair overall clarity. According to the invention, part of this volume is taken up by a displacement element 6, which in the exemplary embodiment according to FIG. 1 is formed as a cup-shaped component in one piece with the retaining plate 5. In this case, the cup-shaped part is of course provided with wall apertures, in order that the gas generated in the case of use can flow into the airbag 2. Alternatively, the cup-shaped component 6 may also have grid-like walls, with individual bars forming a cage-like abutment for the folded together airbag 2. The representation in FIG. 1 shows such a bar in section.

Figure 2:
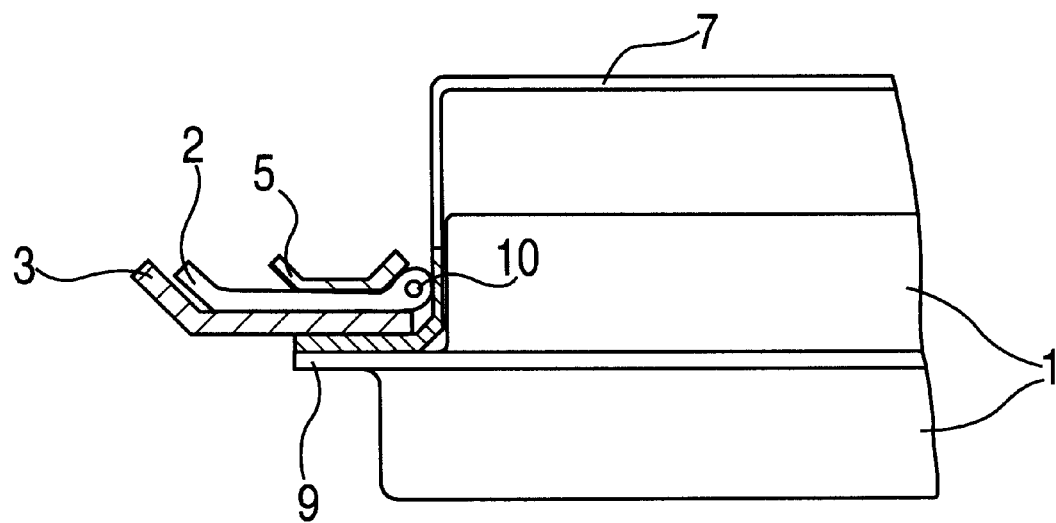
FIG. 2 shows a section through an airbag module in which the displacement element, like the gas generator, is pushed as a separate component into the generator support from the rear side.

In the case of the embodiment according to FIG. 2, on the other hand, an uncut bar of the displacement body 7 is shown, the latter being formed as a separate component, which is independent of the retaining plate 5 and, like the gas generator 1, is pushed into the generator support 3 from the rear side and, bearing against the generator support 3 at the edges on the outside, is fastened between the flange 9 of the gas generator and the generator support by means of screws, rivets or the like. Otherwise, the embodiment according to FIG. 2 coincides with that from FIG. 1.

It should be clear without any further explanation that the displacement elements 6 or 7 can easily be adapted to the respective volume conditions and produced in a way known per se from sections of metal plate, wire meshes or plastics, it just having to be made certain that, with the type of fastening according to FIG. 2, the required sealing between the flange 9 of the gas generator and the generator support 3 is ensured.

I claim:

1. An airbag module for motor vehicle steering wheels, having a gas generator, a folded together airbag, a dish-like generator support, a covering having edges connected to the generator support and having predetermined breaking points, a retaining plate for fastening the airbag on the generator support, wherein all the aforesaid elements form a one-part structural unit connectable to a steering wheel, and a displacement element disposed between the gas generator and the folded together airbag which fills a predetermined proportion of a volume available between the gas generator, the generator support and the covering for the folded together airbag, said predetermined proportion being defined by a difference between said volume and a proportion of said volume being occupied by said folded airbag.

2. The airbag module as claimed in claim 1, wherein the displacement element comprises a cup-shaped component with one of perforated and grid-like walls and which is connected at the edges to its retaining plate.

3. The airbag module as claimed in claim 1, wherein the displacement element comprises a cup-shaped component with one of perforated and grid-like walls and which is formed in one piece with the retaining plate.

4. The airbag module as claimed in claim 3, wherein the cup-shaped component and the retaining plate comprise a section of sheet metal which has been given the form of a hat-like cage by punched-out apertures and non-cutting shaping operations.

5. The airbag module as claimed in claim 3, wherein the cup-shaped component and the retaining plate comprise a plastic part in the form of a hat-like cage, produced by one of injection molding and punching out and thermoforming.

6. An airbag module for motor vehicle steering wheels, having a gas generator, a folded together airbag, a dish-like generator support, a covering having edges connected to the generator support and having predetermined breaking points, a retaining plate for fastening the airbag on the generator support, wherein all the aforesaid elements form a one-part structural unit connectable to a steering wheel, and a displacement element disposed between the gas generator and the folded together airbag which fills a predetermined proportion of a volume available between the gas generator, the generator support and the covering for the folded together airbag, wherein the displacement element comprises a hat-like component which, like the gas generator, is pushed into the generator support from the rear side and is fastened at the edges between the gas generator and the generator support.

7. The airbag module as claimed in claim 6, wherein the hat-like component comprises a section of sheet metal which has been given the form of a hat-like cage by punched-out apertures and non-cutting shaping operations.

8. The airbag module as claimed in claim 6, wherein the hat-like component comprises a plastic part produced by one of injection molding and punching out and thermoforming.

* * * * *